(12) United States Patent
Tang

(10) Patent No.: US 8,489,069 B2
(45) Date of Patent: Jul. 16, 2013

(54) METHOD, APPARATUS, AND SYSTEM FOR QOS CONTROL BASED ON CHARGING SYSTEM

(71) Applicant: Huawei Technologies Co., Ltd., Guangdong (CN)

(72) Inventor: Jie Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/689,149

(22) Filed: Nov. 29, 2012

(65) Prior Publication Data

US 2013/0084881 A1    Apr. 4, 2013

Related U.S. Application Data

(63) Continuation of application No. PCT/CN2011/075166, filed on Jun. 2, 2011.

(30) Foreign Application Priority Data

Aug. 16, 2010   (CN) .......................... 2010 1 0255697

(51) Int. Cl.
   *H04M 11/00*   (2006.01)
   *H04W 72/00*   (2009.01)
   *H04B 17/00*   (2006.01)
   *H04L 1/00*    (2006.01)

(52) U.S. Cl.
   USPC .................... 455/406; 455/452.2; 455/67.13; 370/229

(58) Field of Classification Search
   USPC ....... 455/418, 433, 450, 452.2, 517; 370/230, 370/235, 242, 352, 401, 466, 328.352
   See application file for complete search history.

(56) References Cited

U.S. PATENT DOCUMENTS

6,876,667 B1 * 4/2005 Synnestvedt et al. ......... 370/466

(Continued)

FOREIGN PATENT DOCUMENTS

| CN | 101159568 A | 4/2008 |
| CN | 101316175 A | 12/2008 |

(Continued)

OTHER PUBLICATIONS

International Search Report dated Aug. 18, 2011 in connection with International Patent Application No. PCT/CN2011/075166.

*Primary Examiner* — George Eng
*Assistant Examiner* — Inder Mehra

(57) ABSTRACT

Embodiments of the present invention provide a method, an apparatus, and a system for QoS control based on a charging system. In solutions provided by the embodiments of the present invention, after a service resource reservation request from a PCEF is received, a preset QoS value for a service may be directly determined according to a service identifier of the service from a locally stored mapping relationship between service identifiers and preset QoS values of services, and a QoS value for the service is determined according to the preset QoS value, and the determined QoS value is directly delivered to the PCEF, so that the QoS value for the service may be determined and delivered without the participation of the PCRF, so as to significantly reduce the time for determining the QoS value for the service.

14 Claims, 5 Drawing Sheets

| U.S. PATENT DOCUMENTS | | | |
|---|---|---|---|
| 2008/0273520 A1 | 11/2008 | Kim et al. | |
| 2009/0228956 A1 | 9/2009 | He et al. | |
| 2010/0257582 A1 | 10/2010 | Castellanos Zamora et al. | |
| 2011/0170411 A1* | 7/2011 | Wang et al. | 370/235 |
| 2011/0208853 A1 | 8/2011 | Castro-Castro et al. | |
| 2013/0040685 A1* | 2/2013 | Li | 455/517 |

| FOREIGN PATENT DOCUMENTS | | |
|---|---|---|
| CN | 101754282 A | 6/2010 |
| CN | 101754284 A | 6/2010 |
| WO | WO 2009/065434 A1 | 5/2009 |
| WO | WO 2010/049002 A1 | 5/2010 |

* cited by examiner

METHOD, APPARATUS, AND SYSTEM FOR QOS CONTROL BASED ON CHARGING SYSTEM

CROSS-REFERENCE TO RELATED APPLICATIONS

This application is a continuation of International Application No. PCT/CN2011/075166, filed on Jun. 2, 2011, which claims priority to Chinese Patent Application No. 201010255697.9, filed on Aug. 16, 2010, both of which are hereby incorporated by reference in their entireties.

TECHNICAL FIELD

The present invention relates to the field of communication technologies, and in particular, to a method, an apparatus, and a system for quality of service (QoS, Quality of Service) control based on a charging system.

BACKGROUND

With the in-depth development of the third generation mobile communication (3G, 3rd-generation) technologies, more and more services are provided based on a 3G network. In order to provide different network bearers for different services to utilize network resources more effectively, the conventional 3GPP proposed the policy and charging control (PCC, Policy and Charging Control) control architecture. The PCC control architecture can support dynamic control of bearer network resources according to different users and services, and the PCC control architecture theoretically meets the current increasing requirement for QoS control.

In the conventional PCC control architecture, after receiving a request sent by a user for using a service, a policy and charging enforcement function (PCEF, Policy and Charging Enforcement Function) identifies the service and prepares to request resources from a policy and charging rules function (PCRF, Policy and Charging Rules Function), and triggers a QoS control request from the PCEF to the PCRF. The PCRF searches an internal QoS policy library for a corresponding policy entity according to received information such as service information and user information, and after finding the corresponding policy entity, delivers a QoS policy action to the PCEF. Based on the QoS policy delivered by the PCRF, the PCEF requests resource reservation and granting from an online charging system (OCS, Online Charging System). In the process of requesting resource reservation and granting, a QoS value is sent to the OCS and used as a corresponding charging policy factor for judgment. The OCS makes judgment according to the information of the request and the actual account information of the user, and returns, to the PCEF, a result indicating whether the request succeeds. An actual granting action is performed to the service based on the request result returned by the OCS. If the request succeeds, the QoS is controlled and the user is allowed to use the corresponding service. Otherwise, the user is not allowed to use the corresponding service.

Through research, the inventor finds that in the conventional QoS policy control, because the PCRF only learns about the subscription information of the user and does not learn about whether the user has the ability to enjoy the corresponding QoS currently, the PCRF can only mechanically deliver control parameters to the PCEF according to a predefined policy. After that, only when the PCEF requests resources from the OCS, can the OCS return information about whether there are corresponding resources for enjoying the service. Consequently, a large number of signaling interactions are added inadvertently, and the PCEF also has several invalid control actions and state transitions, which greatly wastes the time for determining the QoS policy and wastes the system resources.

SUMMARY

Embodiments of the present invention provide a method, an apparatus, and a system for QoS control based on a charging system to avoid waste of system resources.

To achieve the above objective, the embodiments of the present invention provide the following technical solutions:

A method for quality of service (QoS) control based on a charging system includes:
  receiving, by a charging function entity, a service resource reservation request that is sent by a policy and charging enforcement function (PCEF) and is generated according to a service request of a user, where the service resource reservation request for a service carries a service identifier of the service;
  acquiring, by the charging function entity, a preset QoS value for the service according to the service identifier of the service;
  determining, by the charging function entity, a QoS value for the service according to the preset QoS value for the service; and
  delivering, by the charging function entity, the QoS value for the service to the PCEF, so that the PCEF allows the user to use the service according to the QoS value for the service.

An apparatus for quality of service (QoS) control based on a charging system includes:
  a receiving unit, configured to receive a service resource reservation request that is sent by a PCEF and is generated according to a service request of a user, where the service resource reservation request carries a service identifier of a service;
  an acquiring unit, configured to acquire a preset QoS value for the service according to the service identifier of the service;
  a first determining unit, configured to determine a QoS value for the service according to the preset QoS value for the service; and
  a delivering unit, configured to deliver the QoS value for the service to the PCEF, so that the PCEF allows the user to use the service according to the QoS value for the service.

A system for quality of service (QoS) control based on a charging system includes: an online charging system (OCS) that is configured to communicate with a policy and charging enforcement function (PCEF), where:
  the PCEF is configured to receive a service request initiated by a user, identify a service, and send a service resource reservation request for the service to the online charging system (OCS), where the service resource reservation request carries a service identifier of the service;
  the OCS is configured to acquire a preset QoS value for the service according to the service identifier carried in the received service resource reservation request; determine a QoS value for the service according to the preset QoS value for the service; and deliver the QoS value for the service to the PCEF; and
  the PCEF is further configured to authorize the user to use the service according to the QoS value for the service.

It can be seen that, in the solutions provided by the embodiments of the present invention, after the service resource reservation request of the PCEF is received, the preset QoS value for the service may be directly determined according to the service identifier of the service from a locally stored mapping relationship between service identifiers and preset QoS values of services, and the QoS value for the service is determined according to the preset QoS value, and the determined QoS value for the service is directly delivered to the PCEF, so that the QoS value for the service can be determined and delivered without the participation of the PCRF, thereby avoiding a problem that system resources used in a large number of interactive actions between the PCRF and the PCEF are wasted after the QoS value provided by the PCRF is finally vetoed by the charging function entity such as the OCS, so as to significantly reduce the time for determining the QoS value for the service, and improving the efficiency of determining the QoS value for the service.

BRIEF DESCRIPTION OF THE DRAWINGS

To make the technical solutions of the embodiments of the present invention or the prior art clearer, accompanying drawings used in the description of the embodiments or the prior art are briefly described hereunder. Evidently, the accompanying drawings illustrate only some embodiments of the present invention and persons of ordinary skill in the art may derive other drawings from these drawings without creative efforts.

DETAILED DESCRIPTION

In order to make persons skilled in the art better understand the technical solutions of the present invention, the technical solutions in the embodiments of the present invention are hereinafter described clearly and completely with reference to the accompanying drawings in the embodiments of the present invention. Evidently, the described embodiments are only some embodiments of the present invention, rather than all embodiments of the present invention. All other embodiments that persons of ordinary skill in the art derive without creative efforts based on the embodiments of the present invention should fall within the protection scope of the present invention.

Figure 1:
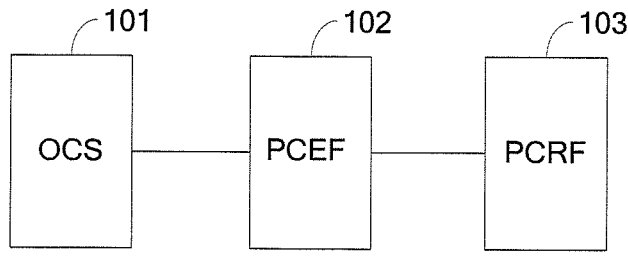
FIG. 1 is a structural diagram of a conventional system for QoS control according to the present invention.

FIG. 1 is a structural diagram of a conventional system for QoS control according to the present invention. As can be known from FIG. 1, in a conventional charging process, when a service requests to use resources, a PCEF may initiate a CCR request to an OCS, where the request may carry QoS information acquired from a PCRF in advance, and the OCS may reserve resources and grant the request according to the QoS information. If the resources of a user are not enough for the requested service, the OCS directly returns a granting failure to the PCEF. The introduction of the PCRF causes a large number of interactive actions between the PCRF and the PCEF, and these actions are all performed under an optimistic assumption, for example, the user has an enough balance. However, the assumption often causes that the OCS vetoes multiple signaling interactions in the last step. Therefore, there is an urgent need for optimizing this signaling interaction process; otherwise the system performance, response time, network resource consumption, and so on will be greatly challenged.

Figure 2:
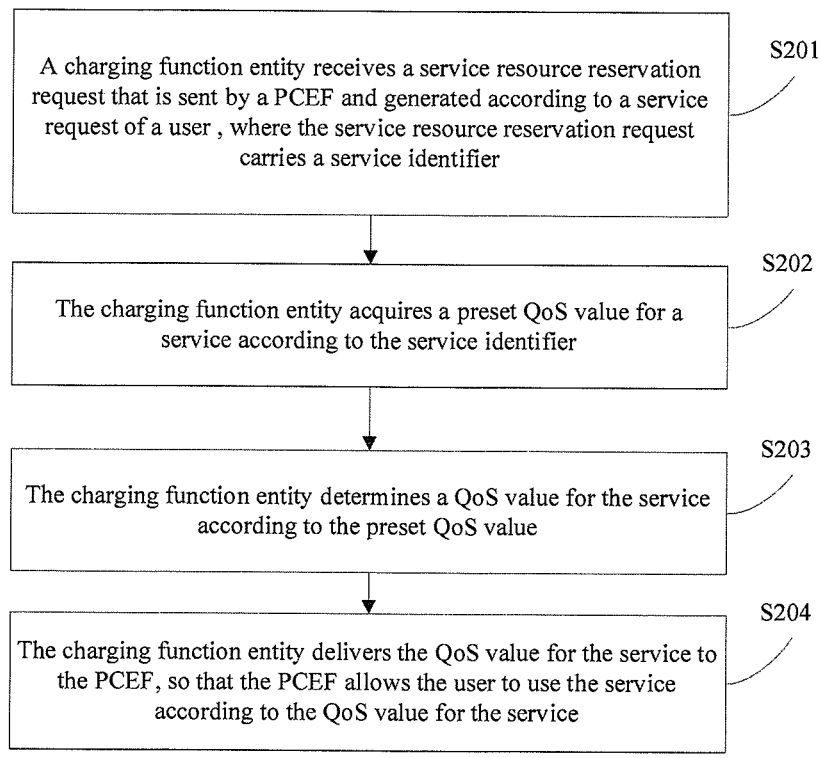
FIG. 2 is a flowchart of a method for QoS control according to an embodiment of the present invention.

Referring to FIG. 2, an embodiment of the present invention provides a method for QoS control based on a charging system. The method includes the following steps:

S201. A charging function entity receives a service resource reservation request that is sent by a PCEF and generated according to a service request of a user, where the service resource reservation request carries a service identifier.

A service in the embodiment of the present invention may be any service, such as a voice service and a video playing service. The service resource reservation request is generated according to the service request of the user, and is used for requesting an OCS to reserve resources required by the service requested by the user. It should be noted that the service resource reservation request carries the service identifier. The service identifier is used for distinguishing which specific service is currently requested by the user.

S202. The charging function entity acquires a preset QoS value for the service according to the service identifier.

In this embodiment of the present invention, in order to acquire the preset QoS value for the service according to the service identifier, corresponding QoS configuration needs to be added into the service information of the OCS to store the preset QoS value for the service. Specifically, a mapping relationship between service identifiers of various services and QoS values may be established locally in the OCS in advance. The service identifiers may be service names, or special numbers specifically set for various services, or the like, and this embodiment imposes no limitation thereto.

The preset QoS value for the service may be set according to needs, for example, the preset OoS value may be set as the lowest QoS value for enabling the service. Of course, the preset OoS value may be set as a QoS value for consuming the service better, and this embodiment imposes no limitation thereto.

S203. The charging function entity determines a QoS value for the service according to the preset QoS value; in an embodiment, the charging function entity may directly use the preset QoS value as the QoS value for the service.

In other embodiments of the present invention, the charging function entity may also determine the QoS value for the service based on the preset QoS value for the service and in combination with attribute parameters of the user.

The attribute parameters of the user may include the current balance of the user, a service level of the user, and so on. The present invention does not limit the attribute parameters of the user. For example, when the current balance of the user is high, the QoS value remains unchanged or is increased based on the preset QoS value; and when the current balance of the user is low, the QoS value is decreased based on the preset QoS value. Whether the balance is high or low may be judged by comparing the balance with a set reference value.

In another example, when the service level of the user is high, the QoS value is increased based on the preset QoS value; and when the service level of the user is low, the QoS value is decreased based on the preset QoS value.

Hereinafter, the current balance of the user is taken as an example for description. If there is an enough balance for the current user which can meet the requirement of the preset QoS for the service, the charging function entity may directly use the preset QoS value as the QoS value for the service required by the current user.

If the current balance of the user is not enough, the charging function entity may reset the QoS value for the service in combination with the current balance in an account of the user as the QoS value for the service. For example, the QoS value for the service may be decreased moderately in combination with the current balance in the account of the user and the decreased QoS value is used as a re-determined QoS value for the current service, so that the user can enjoy the service according to the re-determined QoS value.

In practical applications, generally, there is a basic requirement for the QoS value for each service, and when the balance of the user cannot meet the most basic requirement for the QoS value, the charging function entity may directly prompt the user that the balance is not enough for enjoying the requested service.

It should be noted that in this embodiment of the present invention, the current QoS value for the service that is finally determined by the charging function entity is referred to as the QoS value for the service.

S204. The charging function entity delivers the QoS value for the service to the PCEF, so that the PCEF allows the user to use the service according to the QoS value for the service.

The charging function entity in the method provided by the embodiment of the present invention may be an OCS or any other charging function entity that can implement the method provided by the embodiment of the present invention.

In practical applications, the PCEF may be an independent function entity or may be implemented by a physical entity—a gateway GPRS support node (GGSN, Gateway GPRS Support Node). The present invention imposes no limitation thereto.

In conventional QoS control schemes, the PCEF is generally implemented by a physical entity—the GGSN. There are a large number of interactive actions between the PCRF and the GGSN (namely, the PCEF), and these actions are all performed under an assumption that the balance of the user is enough. However, in practical applications, this assumption is not true in many cases, and therefore, the charging function entity (such as the OCS) vetoes multiple signaling interactions in the last step, so that the previous interactions performed between the PCRF and the GGSN become useless, thereby causing great waste to the system performance, response time, and network resource consumption. In the method provided by the embodiment of the present invention, after receiving the service resource reservation request from the PCEF, the charging function entity may directly determine the preset QoS value for the service, according to the service identifier carried in the service resource reservation request, from a locally stored mapping relationship between service identifiers and preset QoS values of services; determine the QoS value for the service according to the preset QoS value (for example, the preset QoS value is to meet the most basic QoS capability of the service, and a subsequent QoS value remains unchanged, is increased, or is decreased based on this preset QoS value); and directly deliver the determined QoS value for the service to the PCEF, so that the QoS value for the service may be determined and delivered without the participation of the PCRF, thereby avoiding a problem that system resources used in a large number of interactive actions between the PCRF and the PCEF are wasted after the QoS value provided by the PCRF is finally vetoed by the charging function entity, so as to significantly reduce the time for determining the QoS value for the service, and improve the efficiency of determining the QoS value for the service.

The method provided by the embodiment of the present invention is further described hereinafter in combination with a specific application scenario.

Figure 3:
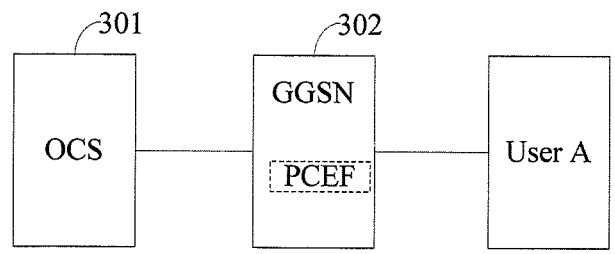
FIG. 3 is a structural diagram of a control system according to an embodiment of the present invention.

In an embodiment of the present invention, the charging function entity is implemented by an OCS 301 and the PCEF is implemented by a GGSN 302. Referring to FIG. 3, main subjects involved in the embodiment include: a user A, an OCS 301, and a GGSN 302. Specifically, it is assumed that: The user A subscribes to a certain product B in the OCS 301, the product includes a VoIP service, the traffic charge for the service is 1 yuan/MB, and a preset QoS value is 384 kbps.

Figure 4:
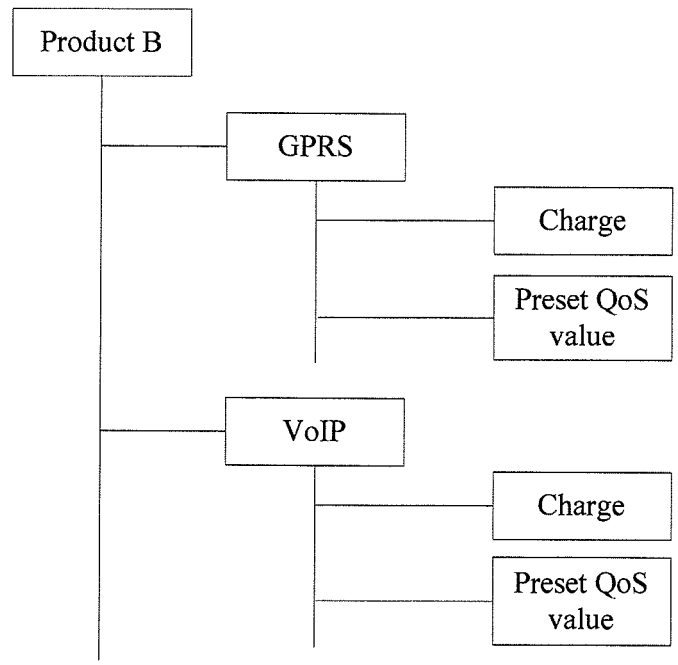
FIG. 4 is a schematic tree-like information diagram according to an embodiment of the present invention.

The preset QoS value of each service may be recorded in the OCS 301 by a tree-like service information table as shown in FIG. 4. The tree-like service information table currently has three levels. The first level is product name, the second level is service name, and the third level is service information of each service. As can be seen from FIG. 4, the product B includes at least two services, namely, a GPRS service and a VoIP service. Currently, two types of information are recorded for each service: one is a preset QoS value, and the other is charge information.

Figure 5:
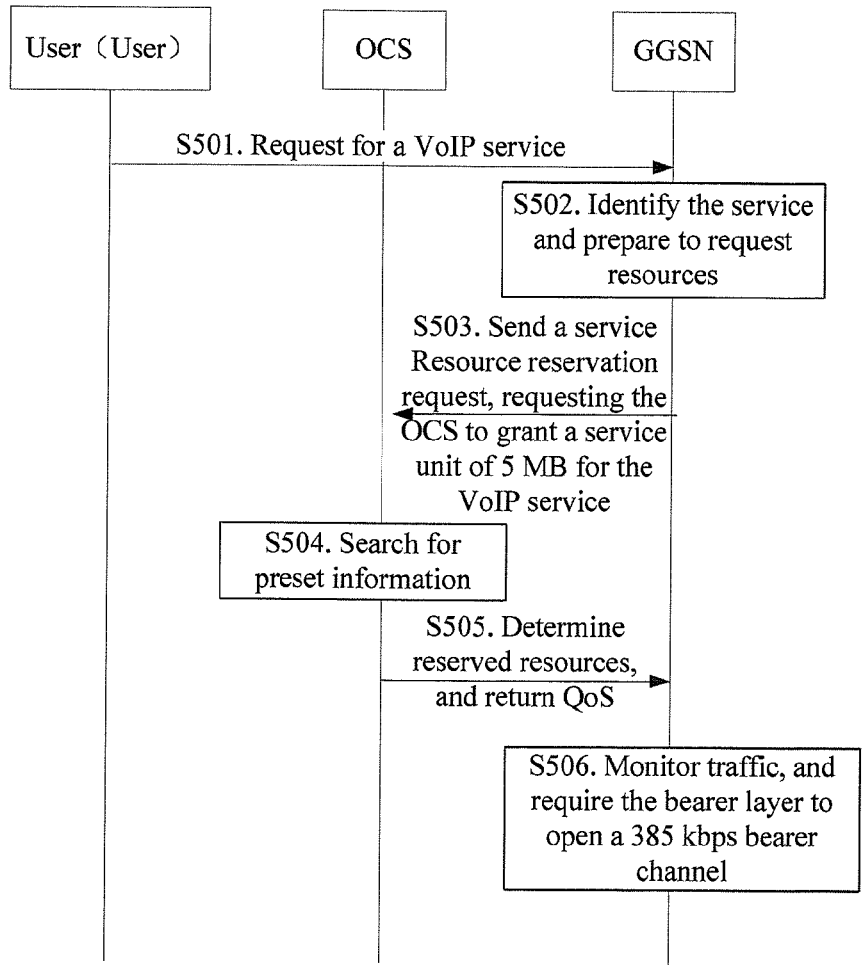
FIG. 5 is a signaling interaction diagram of a method for QoS control according to another embodiment of the present invention.

It is assumed that the balance of the user is 100 yuan currently. Referring to FIG. 5, the determination method provided by the embodiment of the present invention includes the following steps:

S501. The user A initiates a request for a VoIP service, and the request is routed to the PCEF.

S502. The PCEF identifies the service and prepares to request resources.

S503. The PCEF sends a service resource reservation request to the OCS, requesting the OCS to grant a service unit of 5 MB for the VoIP service.

S504. The OCS finds the product B according to the products subscribed by the user and determines, according to the service information of the product B, that the charge for the VoIP service is 1 yuan/MB and that the preset QoS value for the service is 384 kbps.

S505. According to the charge for the VoIP service and by comparing the balance with the reservation request, the OCS determines that the balance of the user A is enough to use 5 MB, so the OCS reserves 5 yuan for the VoIP service, and returns a resource reservation response message to the PCEF, where the message carries the QoS value, namely, 384 kbps.

S506. The PCEF begins to monitor traffic according to the received resource reservation response message, and meanwhile, according to the QoS value carried in the resource reservation response message, requests a bearer layer to open a 384 kbps bearer channel.

After the bearer layer opens the 384 kbps bearer channel, the user may use the VoIP service through the 384 kbps bearer channel.

In the method provided by the embodiment of the present invention, the OCS may complete the determination and delivery of the QoS value without the participation of the PCRF. The PCEF is only used for the receiving operation and does not participate in the control and delivery, and the PCEF may directly acquire the corresponding QoS value without multiple interactions with the PCRF, and therefore occupation of system resources is significantly reduced, the time for delivering the QoS value is reduced, and delivery efficiency of the QoS value is significantly improved.

In addition, in conventional schemes, after the PCRF delivers the QoS value mechanically, the PCEF needs to change its state and re-coordinate network resources, and if the resources of the user are not enough currently, the state needs to be readjusted backward. With this embodiment, there is no such internal state transition, and therefore multiple transitions of the state of the PCEF are avoided.

In the method provided by the embodiment of the present invention, the QoS value for the service may be set in combination with other attribute parameters of the user. The specific implementation method may be implemented in combination with FIG. 5 and is not repeatedly described herein.

The embodiment as shown in FIG. 5 describes the process that the charging function entity determines and delivers the QoS for the service according to the preset QoS in combination with the current balance of the user. In practical applications, it is also possible that the PCEF has fixedly configured additional QoS for some services, or that a PCRF is configured and an additional QoS value has been carried when the PCEF requests OCS to reserve resources for the service.

Figure 6:
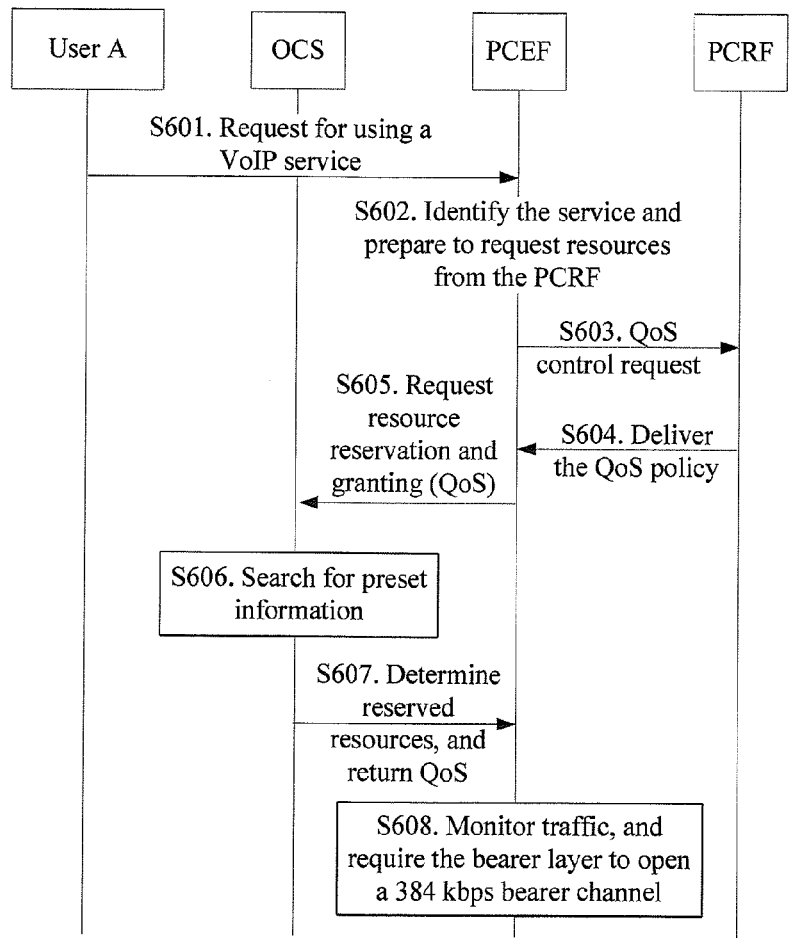
FIG. 6 is a signaling interaction diagram of a method for QoS control according to another embodiment of the present invention.

For example, it is assumed that: A user A subscribes to a product B in the OCS, the product includes a VoIP service, the traffic charge for the service is 1 yuan/MB, and a preset QoS value is 384 kbps. In addition, there is an additional charge and QoS policy configured for the service. The policy is: If the balance of the user is smaller than 50 yuan, a charge rate is decreased to 0.7 yuan/MB, and meanwhile, QoS is configured to 128 kbps. The structure of the system for QoS control according to the embodiment of the present invention is as shown in FIG. 1. There is a PCRF 103 in this scenario. Referring to FIG. 6, the method provided by this embodiment includes:

S601. The user A sends, to the PCEF, a request for using a VoIP service.

S602. The PCEF identifies the service and prepares to request resources from the PCRF.

S603. The PCEF triggers a QoS control request to the PCRF.

S604. The PCRF searches an internal QoS policy library for a corresponding policy entity according to received information, such as information about the VoIP service and information about the user, and after finding the corresponding policy entity, delivers a QoS policy action to the PCEF.

It is assumed that the QoS configured by the PCRF for the user is 384 kbps.

S605. The PCEF sends a service resource reservation request to the OCS based on the QoS policy delivered by the PCRF, for requesting the OCS to grant a service unit of 5 MB for the VoIP service.

In the embodiment of the present invention, in addition to carrying the service identifier of the VoIP service, the service resource reservation request also includes additional QoS information which is 384 kbps, where the information is added by the PCRF for the service.

S606. The OCS finds the product B according to the products subscribed by the user and determines, according to the service information of the product B, that the charge for the VoIP service is 1 yuan/MB and that the preset QoS value for the service is 384 kbps.

S607. According to the charge for the VoIP service and by comparing the balance with the service resource reservation request, the OCS determines that the balance of the user A is enough to use 5 MB. Therefore, the OCS reserves 5 yuan for the VoIP service, and returns a resource reservation response message to the PCEF, where the message carries the QoS value, namely, 384 kbps.

S608. The PCEF begins to monitor traffic according to the received resource reservation response message, and meanwhile, according to the QoS value carried in the resource reservation response message, requests a bearer layer to open a 384 kbps bearer channel.

After the bearer layer opens the 384 kbps bearer channel, the user may use the VoIP service through the 384 kbps bearer channel.

When the user continuously uses the service until the balance is smaller than 50 yuan, according to the charge policy of the product, when reserving resources in a next CCR (Credit Control Request), the OCS may make a budget according to a new charge, namely, 0.7 yuan/MB. Meanwhile, a CCA (Credit Control Answer) including a new QoS value (128 kbps) is delivered to the PCEF. A CCR and a CCA are a pair of standard request and response messages in Diameter (Diameter is a relevant basic protocol for authentication, authorization, and accounting, which is defined by the Internet Engineering Task Force (IETF, Internet Engineering Task Force)), which is used for requesting charging and returning a charging result. The PCEF begins to monitor traffic according to the received resource reservation response message, and meanwhile, according to the QoS value carried in the resource reservation response message, requests a bearer layer to open a 128 kbps bearer channel. The user continues to use the VoIP service through the 128 kbps bearer channel.

As can be seen, in this embodiment, based on the QoS information configured by the PCRF for the user A, the PCEF requests OCS to reserve resources. However, when determining the QoS for the VoIP service, in combination with the change of the balance of the user A, the OCS dynamically adjusts the QoS value with which the user A uses the VoIP service.

Figure 7:
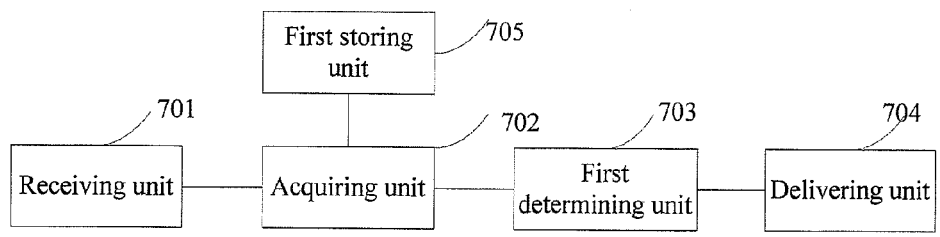
FIG. 7 is a schematic structural diagram of an apparatus according to an embodiment of the present invention.

In the method provided by the embodiment of the present invention, the control of the QoS value by the OCS (S606-607) is introduced into the conventional QoS control scheme, so that the method provided by the embodiment of the present invention can support a more complex QoS control policy, that is, each time the resources are reserved, the QoS policy may be dynamically changed according to the attribute parameters of the user, such as the change of the balance (in the foregoing example, when the balance of the user is larger than 50 yuan, the VoIP service is used through a 384 kbps bearer channel, and when the balance of the user is smaller than 50 yuan, the VoIP service is used through a 128 kbps bearer channel), and the changed policy is directly delivered to the PCEF quickly without any further interactions with the PCRF, and therefore occupation of system resources is significantly reduced, the time for delivering the QoS value is reduced, and delivery efficiency of the QoS value is significantly improved. Referring to FIG. 7, an embodiment of the present invention also provides an apparatus for QoS control based on a charging system, and the apparatus may be located in an OCS or another charging function entity. When being implemented, the apparatus may implement the methods shown in FIG. 2, FIG. 5, or FIG. 6. The apparatus includes:

a receiving unit 701, configured to receive a service resource reservation request that is sent by a PCEF and is generated according to a service request of a user, where the service resource reservation request carries a service identifier of a service;

an acquiring unit 702, configured to acquire a preset QoS value for the service according to the service identifier of the service;

a first determining unit 703, configured to determine a QoS value for the service according to the preset QoS value for the service; and a delivering unit 704, configured to deliver the QoS value for the service to the PCEF, so that the PCEF allows the user to use the service according to the QoS value for the service.

In order to make the acquiring unit 702 acquire the preset QoS value for the service conveniently and quickly, the apparatus also includes:

a first storing unit 705, configured to add corresponding QoS configuration into service information to store the preset QoS value for the service.

In another embodiment of the present invention, the storing unit 705 may also pre-store the attribute parameters of the user, and the attribute parameters include the current balance of the user and the service level of the user.

Further, the determining unit 703 is further configured to determine the QoS value for the service based on the preset QoS value for the service and in combination with the attribute parameters of the user. For example, when the current balance of the user is high, the QoS value is increased based on the preset QoS value; and when the current balance of the user is low, the QoS value is decreased based on the preset QoS value. Whether the balance is high or low may be judged by comparing the balance with a set reference value. In another example, when the service level of the user is high, the QoS value is increased based on the preset QoS value; and when the service level of the user is low, the QoS value is decreased based on the preset QoS value.

For the specific process that the determining unit 703 determines the QoS value for the service according to the attribute parameters of the user, reference can be made to the method embodiments as shown in FIG. 5 and FIG. 6, and details are not repeated herein.

With the apparatus provided by the embodiment of the present invention, the determination and delivery of the QoS value may be completed by the apparatus alone and without the participation of a PCRF, and meanwhile, the PCEF may directly acquire the corresponding QoS value without multiple interactions with the PCRF, and therefore the occupation of system resources is significantly reduced, and the time for delivering the QoS value is reduced, and the delivery efficiency of the QoS value is significantly improved.

In addition, in conventional schemes, after the PCRF delivers the QoS value mechanically, the PCEF needs to change its state and re-coordinate network resources, and if the resources of the user are not enough currently, the state needs to be readjusted backward. With this embodiment, there is no such internal state transition, and therefore multiple transitions of the state of the PCEF are avoided.

Figure 8:
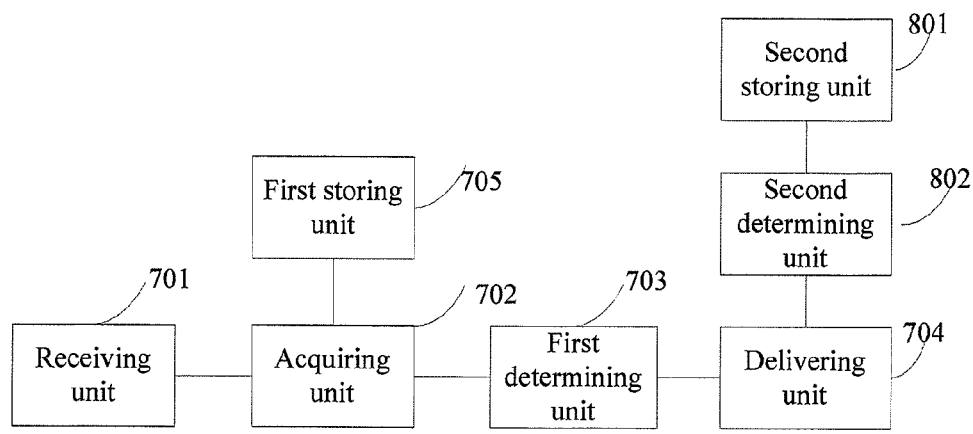
FIG. 8 is a schematic structural diagram of an apparatus according to another embodiment of the present invention.

In another embodiment of the present invention, different QoS policies may be set according to the attribute parameters of the user, such as the change of the balance of the user. With respect to this case, referring to FIG. 8, this embodiment also provides another apparatus. In addition to the units in FIG. 7, the apparatus also includes:

a second storing unit 801, configured to store an additional service charge and QoS policy for the service; and a second determining unit 802, configured to monitor the current balance of the user, and when the current balance of the user reaches criteria of the additional charge and QoS policy, re-determine a QoS value according to the additional charge and QoS policy.

The delivering unit 704 is further configured to deliver the re-determined QoS value to the PCEF, so that the PCEF authorizes the user to use the service according to the re-determined QoS value.

The apparatus provided by the embodiment of the present invention works under the architecture of a conventional QoS control system. The apparatus provided by the embodiment of the present invention can support a more complex QoS control policy, that is, each time the resources are reserved, the QoS policy is changed dynamically, and the changed policy is directly delivered to the PCEF quickly without any further interaction with the PCRF, and therefore the occupation of system resources is significantly reduced, the time for delivering the QoS value is reduced, and the delivery efficiency of the QoS value is significantly improved.

Figure 9:
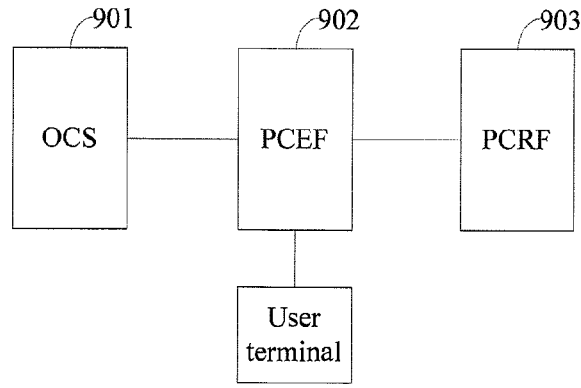
FIG. 9 is a schematic structural diagram of a system according to an embodiment of the present invention.

An embodiment of the present invention also provides a system for QoS control based on a charging system. Referring to FIG. 9, the system includes:

a PCEF 901, configured to receive a service request initiated by a user, identify a service, and send a service resource reservation request for the service to an online charging system (OCS), where the service resource reservation request carries a service identifier of the service; and an OCS 902, configured to acquire a preset QoS value for the service according to the service identifier carried in the received service resource reservation request; determine a QoS value for the service according to the preset QoS value for the service; and deliver the QoS value for the service to the PCEF.

The PCEF 901 is further configured to authorize the user to use the service according to the QoS value for the service.

Preferably, the OCS is further configured to add corresponding QoS configuration into service information to store the preset QoS value for the service.

With the system provided by the embodiment of the present invention, the determination and delivery of the QoS value may be completed by the OCS alone and without the participation of the PCRF, and meanwhile, the PCEF may directly acquire the corresponding QoS value without multiple interactions with the PCRF, and therefore the occupation of system resources is reduced significantly, the time for delivering the QoS value is reduced, and the delivery efficiency of the QoS value is significantly improved.

In addition, in conventional schemes, after the PCRF delivers the QoS value mechanically, the PCEF needs to change its state and re-coordinate network resources, and if the resources of the user are not enough currently, the state needs to be readjusted backward. With the present invention, there is no such internal state transition, and therefore multiple transitions of the state of the PCEF are avoided.

In other embodiments of the present invention, the determining the QoS value for the service by the OCS also includes:

determining the QoS value for the service based on the preset QoS value for the service and in combination with the attribute parameters of the user.

Specifically, the attribute parameters of the user include the current balance of the user, a service level of the user, and so on. For the specific process, reference can be made to the method embodiments as shown in FIG. 5 and FIG. 6, and details are not repeatedly described herein.

In another embodiment of the present invention, the system as shown in FIG. 9 also includes a PCRF 903.

The PCEF 901 is further configured to trigger QoS control request to the PCRF according to the service identifier of the service after identifying the service and before sending the service resource reservation request to the online charging system (OCS).

The PCRF 903 is configured to search a policy library for an additional QoS value that corresponds to the service according to the service identifier of the service, and return the additional QoS value to the PCEF.

The PCEF 901 is configured to send a service resource reservation request of the service carrying the additional QoS value to the OCS.

The OCS 902 is further configured to acquire the additional QoS value carried in the service resource reservation request of the service; and determine the QoS value for the service according to the preset QoS value for the service, making reference to the additional QoS value and in combination with the current balance of the user.

Preferably, the OCS 902 is further configured to store the additional charge and QoS policy of the service; monitor the current balance of the user, and when there is a preset additional charge and QoS policy configured for the service, and the current balance of the user reaches the criteria of the additional charge and QoS policy, the OCS 902 is configured to re-determine the QoS value according to the additional charge and QoS policy and deliver the re-determined QoS value to the PCEF.

The PCEF 901 is further configured to authorize the user to use the service according to the re-determined QoS value.

In the system provided by the embodiment of the present invention, the control of the QoS value by the OCS is introduced into the conventional QoS control scheme, so that the system provided by the embodiment of the present invention can support a more complex QoS control policy, that is, each time the resources are reserved, the QoS policy is changed dynamically, and the changed policy is directly delivered to the PCEF quickly without any further interactions with the PCRF, and therefore occupation of system resources is reduced significantly, time for delivering the QoS value is reduced, and delivery efficiency of the QoS value is significantly improved.

The present invention may be described in the general context of computer-executable instructions, such as program modules, executed by a computer. Generally, program modules include routines, programs, objects, components, data structures, and so on that perform particular tasks or implement particular abstract data types. The present invention may also be practiced in distributed computing environments where tasks are performed by remote processing devices that are connected through a communication network. In a distributed computing environment, program modules may be located in both local and remote computer storage media including storage devices.

Described above are only preferred embodiments of the present invention. It should be noted that persons of ordinary skills in the art may make improvements and refinements without departing from the principle of the present invention, and these improvements and refinements shall also be considered to fall within the protection scope of the present invention.

What is claimed is:

1. A method for quality of service (QoS) control based on a charging system, the method comprising:
    receiving, by a charging function entity, a service resource reservation request that is sent by a policy and charging enforcement function (PCEF) and is generated according to a service request of a user, wherein the service resource reservation request of a service carries a service identifier of the service;
    acquiring, by the charging function entity, a preset QoS value for the service according to the service identifier of the service;
    determining, by the charging function entity, a QoS value for the service according to the preset QoS value for the service, which further comprises:
        determining the QoS value for the service based on the preset QoS value for the service and in combination with attribute parameters of the user, wherein the attribute parameters of the user comprise a current balance of the user; and
    delivering, by the charging function entity, the QoS value for the service to the PCEF, so that the PCEF allows the user to use the service according to the QoS value for the service;
    when there is a preset additional charge and QoS policy configured for the service, and the current balance of the user reaches criteria of the additional charge and QoS policy, re-determining a QoS value according to the additional charge and QoS policy and delivering the re-determined QoS value to the PCEF, so that the PCEF authorizes the user to use the service according to the re-determined QoS value.

2. The method according to claim 1, wherein the attribute parameters of the user further comprise:
    a service level of the user.

3. The method according to claim 1, wherein before finding the preset QoS value for the service according to the service identifier of the service, the method further comprises:
    adding corresponding QoS configuration into service information to store the preset QoS value for the service.

4. The method according to claim 1, wherein the service resource reservation request of a service further carries an additional QoS value, wherein the additional QoS value is returned from a PCRF to the PCEF after the PCEF identifies the service and triggers QoS control to the PCRF according to the service identifier of the service and the PCRF acquires the additional QoS value from a policy library according to the service identifier of the service;
    the method further comprises:
    acquiring the additional QoS value carried in the received service resource reservation request for the service;
    the determining the QoS value for the service based on the preset QoS value for the service and in combination with attribute parameters of the user further comprises:
    determining, by the charging function entity, the QoS value for the service with reference to the additional QoS value and according to the preset QoS value for the service and in combination with the current balance of the user.

5. An apparatus for quality of service (QoS) control based on a charging system, the apparatus comprising:
    a receiving unit, configured to receive a service resource reservation request that is sent by a PCEF and is generated according to a service request of a user, wherein the service resource reservation request carries a service identifier of a service;
    an acquiring unit, configured to acquire a preset QoS value for the service according to the service identifier of the service;
    a first determining unit, configured to determine a QoS value for the service according to the preset QoS value for the service, wherein the first determining unit is further configured to determine the QoS value for the service based on the preset QoS value for the service and in combination with a current balance of the user;

a delivering unit, configured to deliver the QoS value for the service to the PCEF, so that the PCEF allows the user to use the service according to the QoS value for the service;

a second storing unit, configured to store an additional service charge and QoS policy of the service; and a second determining unit, configured to monitor the current balance of the user, and when the current balance of the user reaches criteria of the additional charge and QoS policy, re-determine a QoS value according to the additional charge and QoS policy; wherein the delivering unit is further configured to deliver the re-determined QoS value to the PCEF, so that the PCEF authorizes the user to use the service according to the re-determined QoS value.

6. The apparatus according to claim 5, further comprising:
a first storing unit, configured to add corresponding QoS configuration into service information to store the preset QoS value for the service.

7. The apparatus according to claim 6, wherein:
the first storing unit is further configured to pre-store attribute parameters of the user.

8. The apparatus according to claim 5, wherein the service resource reservation request of a service further carries an additional QoS value, wherein the additional QoS value is returned from a PCRF to the PCEF after the PCEF identifies the service and triggers QoS control to the PCRF according to the service identifier of the service and the PCRF acquires the additional QoS value from a policy library according to the service identifier of the service;

the acquiring unit is further configured to acquire the additional QoS value carried in the received service resource reservation request for the service;

the first determining unit is further configured to determine the QoS value for the service with reference to the additional QoS value and according to the preset QoS value for the service and in combination with the current balance of the user.

9. A system for quality of service (QoS) control based on a charging system, the system comprising: an online charging system (OCS) that is configured to communicate with a policy and charging enforcement function (PCEF), wherein:

the PCEF is configured to receive a service request initiated by a user, identify a service, and send a service resource reservation request for the service to the online charging system (OCS), wherein the service resource reservation request carries a service identifier of the service;

the OCS is configured to acquire a preset QoS value for the service according to the service identifier carried in the received service resource reservation request; determine a QoS value for the service according to the preset QoS value for the service; and deliver the QoS value for the service to the PCEF;

the PCEF is further configured to authorize the user to use the service according to the QoS value for the service;

the OCS is further configured to store an additional charge and QoS policy of the service; monitor a current balance of the user, and when there is a preset additional charge and QoS policy configured for the service, and the current balance of the user reaches criteria of the additional charge and QoS policy, re-determine a QoS value according to the additional charge and QoS policy and deliver the re-determined QoS value to the PCEF; and the PCEF is further configured to authorize the user to use the service according to the re-determined QoS value.

10. The system according to claim 9, wherein:
the OCS is further configured to add corresponding QoS configuration into service information to store the preset QoS value for the service.

11. The system according to claim 9, wherein:
the system further comprises: a policy and charging rules function (PCRF);

the PCEF is further configured to trigger QoS control to the PCRF according to the service identifier of the service after identifying the service and before sending the service resource reservation request to the online charging system (OCS);

the PCRF is configured to search a policy library for an additional QoS value corresponding to the service according to the service identifier of the service, and return the additional QoS value to the PCEF;

the PCEF is configured to carry the additional QoS value in the service resource reservation request for the service, wherein the request is sent to the OCS; and the OCS is further configured to acquire the additional QoS value carried in the service resource reservation request for the service; and determine the QoS value for the service with reference to the additional QoS value and according to the preset QoS value for the service and in combination with a current balance of the user.

12. A system for quality of service (QoS) control based on a charging system, the system comprising: an online charging system (OCS) that is configured to communicate with a policy and charging enforcement function (PCEF), wherein:

the PCEF is configured to receive a service request initiated by a user, identify a service, and send a service resource reservation request for the service to the online charging system (OCS), wherein the service resource reservation request carries a service identifier of the service;

the OCS is configured to acquire a preset QoS value for the service according to the service identifier carried in the received service resource reservation request; determine a QoS value for the service according to the preset QoS value for the service; and deliver the QoS value for the service to the PCEF; and the PCEF is further configured to authorize the user to use the service according to the QoS value for the service;

the system further comprises: a policy and charging rules function (PCRF);

the PCEF is further configured to trigger QoS control to the PCRF according to the service identifier of the service after identifying the service and before sending the service resource reservation request to the OCS;

the PCRF is configured to search a policy library for an additional QoS value corresponding to the service according to the service identifier of the service, and return the additional QoS value to the PCEF;

the PCEF is configured to carry the additional QoS value in the service resource reservation request for the service, wherein the request is sent to the OCS; and the OCS is further configured to acquire the additional QoS value carried in the service resource reservation request for the service; and determine the QoS value for the service with reference to the additional QoS value and according to the preset QoS value for the service and in combination with a current balance of the user.

13. A method for quality of service (QoS) control based on a charging system, the method comprising:

receiving, by a charging function entity, a service resource reservation request that is sent by a policy and charging enforcement function (PCEF) and is generated according to a service request of a user, wherein the service resource reservation request of a service carries a service identifier of the service and an additional QoS value, wherein the additional QoS value is returned from a PCRF to the PCEF after the PCEF identifies the service and triggers QoS control to the PCRF according to the service identifier of the service and the PCRF acquires the additional QoS value from a policy library according to the service identifier of the service;

acquiring, by the charging function entity, the additional QoS value carried in the received service resource reservation request for the service and a preset QoS value for the service according to the service identifier of the service carried in the received service resource reservation request;

determining, by the charging function entity, a QoS value for the service with reference to the additional QoS value and according to the preset QoS value for the service and in combination with a current balance of the user; and delivering, by the charging function entity, the QoS value for the service to the PCEF, so that the PCEF allows the user to use the service according to the QoS value for the service.

14. An apparatus for quality of service (QoS) control based on a charging system, the apparatus comprising:

a receiving unit, configured to receive a service resource reservation request that is sent by a policy and charging enforcement function (PCEF) and is generated according to a service request of a user, wherein the service resource reservation request of a service carries a service identifier of the service and an additional QoS value, wherein the additional QoS value is returned from a PCRF to the PCEF after the PCEF identifies the service and triggers QoS control to the PCRF according to the service identifier of the service and the PCRF acquires the additional QoS value from a policy library according to the service identifier of the service;

an acquiring unit, configured to the additional QoS value carried in the received service resource reservation request for the service and a preset QoS value for the service according to the service identifier of the service carried in the received service resource reservation request;

a first determining unit, configured to a determine a QoS value for the service with reference to the additional QoS value and according to the preset QoS value for the service and in combination with a current balance of the user;

a delivering unit, configured to deliver the QoS value for the service to the PCEF, so that the PCEF allows the user to use the service according to the QoS value for the service.

* * * * *